(12) United States Patent
Filipovich et al.

(10) Patent No.: US 9,507,153 B2
(45) Date of Patent: Nov. 29, 2016

(54) NIGHT VISION DEVICES AND METHODS

(75) Inventors: Danny Filipovich, Lincolnwood, IL (US); Lillian Filipovich, legal representative, Lincolnwood, IL (US); Jack C. Fiore, Iverness, IL (US); Eric Ford, Shadow Hills, CA (US)

(73) Assignee: Elbit Systems Ltd Advanced Technology Center, Haifa (IL)

( * ) Notice: Subject to any disclaimer, the term of this patent is extended or adjusted under 35 U.S.C. 154(b) by 281 days.

(21) Appl. No.: 14/343,156

(22) PCT Filed: Sep. 8, 2012

(86) PCT No.: PCT/US2012/054332
§ 371 (c)(1),
(2), (4) Date: Apr. 29, 2014

(87) PCT Pub. No.: WO2013/036888
PCT Pub. Date: Mar. 14, 2013

(65) Prior Publication Data
US 2014/0327971 A1 Nov. 6, 2014

Related U.S. Application Data

(60) Provisional application No. 61/532,389, filed on Sep. 8, 2011.

(51) Int. Cl.
| | |
|---|---|
| *G02B 27/14* | (2006.01) |
| *G02B 27/01* | (2006.01) |
| *G02B 17/08* | (2006.01) |
| *G02B 23/12* | (2006.01) |

(52) U.S. Cl.
CPC ....... *G02B 27/0172* (2013.01); *G02B 17/0816* (2013.01); *G02B 23/125* (2013.01)

(58) Field of Classification Search
CPC .. G02B 27/0172; G02B 23/12; G02B 13/16; G02B 23/125; G02B 13/14; G02B 13/008; H01J 31/50
See application file for complete search history.

(56) References Cited

U.S. PATENT DOCUMENTS

| | | |
|---|---|---|
| 5,229,598 A | 7/1993 | Filipovich et al. |
| 6,088,165 A | 7/2000 | Janeczko et al. |
| 6,791,760 B2 | 9/2004 | Janeczko et al. |
| 7,755,831 B2 * | 7/2010 | Filipovich .......... G02B 17/0852 250/214 LA |
| 7,791,809 B2 | 9/2010 | Filipovich et al. |

OTHER PUBLICATIONS

PCT International Preliminary Report on Patentability; application No. PCT/US2012/054332, mailed Feb. 26, 2013.

* cited by examiner

*Primary Examiner* — Joseph P Martinez (57) ABSTRACT

Image-intensifying devices (for example, glasses, goggles, etc.) suitable for certain commercial and entertainment applications by virtue of their light weight, small size, and economical production are disclosed. In one embodiment, input light passes through an Amici reflector, which is used to adjust the orientation of the intensified image to register it with the real world. In another embodiment, input light passes through at least two Amici reflectors, which are used to adjust the orientation of the intensified image to register it with the real world. In alternate embodiments, at least one Amici reflector folds the light at a non-perpendicular angle and/or input light is rotated by an angle other than (180°). Other embodiments include a field-flattening lens disposed in front of an image intensifier. The intensified image is then sent through a projective lens assembly to reach the viewer's eye.

31 Claims, 8 Drawing Sheets

NIGHT VISION DEVICES AND METHODS

This application claims priority to U.S. Provisional Patent Application No. 61/532,389, filed Sep. 8, 2011, the entirety of which is hereby incorporated herein by reference.

FIELD

Some embodiments disclosed herein relate to optical systems and elements, and in particular to a system having significant infrared properties and a folded optical path, forming night vision glasses that provide the wearer with an intensified image of the real world.

BACKGROUND

For many years, night vision technology has enabled military personnel to view scenes in very low light conditions. However, many of these night vision systems have weight distributions and overall bulk that can make them unsuitable for many other applications, such as many civil and entertainment applications. These systems frequently require additional support, which frequently comes from an external structure such as a vehicle frame, a pilot's helmet, or one or both of the user's hands. Certain features of the present invention address these and other needs and provide other important advantages.

SUMMARY

A useful feature of see-through night vision devices (devices in which the user views the real world scene and the intensified image simultaneously, which include various forms of night vision glasses) is to have an image entering the viewer's eye, such as an intensified image reflected off the visor, accurately registered onto the real world scene as viewed through the visor. In other words, it is desired to have the enhanced image aligned with and overlying the real world. Registration of the image can be accomplished by adjusting the fold angles of various reflectors in the objective lens assembly. Both directional and angular orientation of the image can be adjusted in this way.

Reflectors can be used to direct light passing through the objective lens assembly. The number and location of the reflectors are specific for a particular night vision system. In general, if the optics of the eyepiece assembly (sometimes described as a "projective lens" assembly in certain prior art devices) contains an even (odd) number of reflections, the objective lens assembly will generally contain an even (odd) number of reflections so that the total number of reflections always remains even, thereby rendering the intensified image with the same "handedness" as the real world scene (i.e., the intensified image will not be a reversion, or mirror image, of the real world). In embodiments described herein, there are a minimum of four reflections in the objective lens assembly. One embodiment described herein has two (2) Amici reflectors which has a total of four (4) reflections (two (2) in each Amici). A second embodiment has two (2) flat reflectors and one Amici reflector which, again, has a total of four (4) reflections.

As generally known in the art, an objective lens assembly with two flat reflectors generally maintains the proper handedness of the image; however, proper adjustment of the fold angles of these reflectors to correct both directional and angular orientation of the image may be difficult, if not impossible, to achieve for a particular night vision device given its particular physical configuration. A possible explanation for this result could be that the fold angles required to achieve proper image orientation are either too large or too small to be physically attainable when using only two (2) flat reflectors.

It was discovered that including an Amici reflector (which can be defined by either an Amici prism or an Amici mirror) along with the two flat reflectors in the objective lens assembly achieved some unexpected results. Since an Amici reflector inherently includes two reflections, the correct handedness of an image was maintained when an Amici reflector was used in conjunction with two flat reflectors—the arrangement having a total of four reflections. Surprisingly, it was discovered that this arrangement also rotated the intensified image to a new starting position that allowed the angular orientation of the image to be fully corrected. By adjusting the fold angles, the image could be properly registered to the real world. The starting point of the adjustment range was shifted so that the fold angles required for full directional and angular correction were within a practical adjustment range.

Objective lens assemblies with two Amici reflectors—one Amici reflector being used in lieu of the two flat reflectors described above—were found to possess similar qualities. This arrangement also had a total of four reflections, two in each of the Amici reflectors, so the handedness was again maintained. And, again, it was possible to fully correct the directional and angular alignment of the image. By simply adjusting the fold angles, full correction was again attained.

The Amici reflectors in the night vision devices rotate the intensified image to a new starting position so that adjustment of the fold angles can be used to fully correct the directional and angular alignment of the image.

Embodiments of the present invention provide improved night vision systems and devices, and particular embodiments provide improved night vision glasses.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DESCRIPTION

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only. Discussions pertaining to specific compositions of matter, if present, are presented as examples only and do not limit the applicability of other compositions of matter, especially other compositions of matter with similar properties, unless otherwise indicated.

One form of the system disclosed herein is a pair of glasses that includes night vision technology to provide an intensified image to the wearer. Various embodiments are mounted on eyeglasses or other eyewear, and are balanced and light enough to stay on the user's face. Other forms include wrap-around glasses, helmet-based forms, mirror-based forms, and other embodiments that will occur to those skilled in the art in view of this disclosure. For clarity, the word "visor" will be used to refer to the object that is within the view of the wearer, and off which the generated image(s) reflect(s), though that object might just as well be a lens, mirror, or other (at least partially reflective) object, whether or not the word "visor" would typically be used to describe it.

Figure 1:
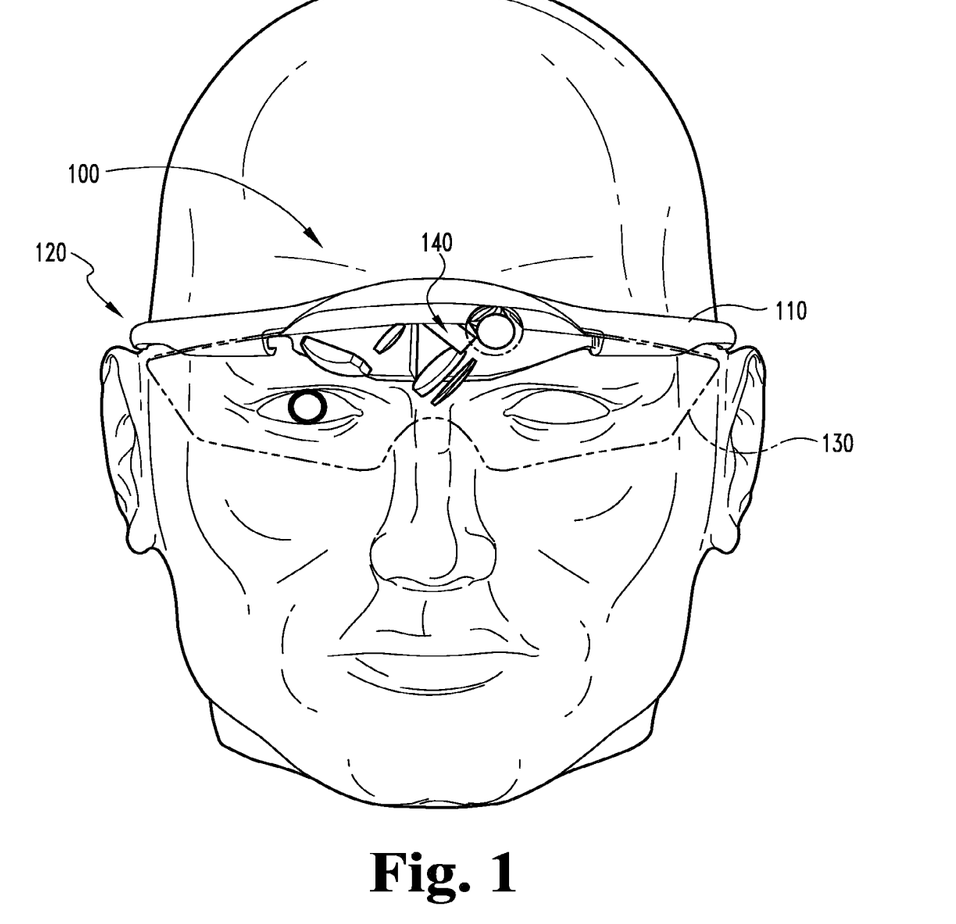
FIG. 1 is a front view of a pair of night vision glasses according to one embodiment.

Turning to FIG. 1, night vision glasses 100 comprise a frame 110, stems 120, an optical module 140, and a visor 130 as are customary or desirable. Optical module 140 converts received low light level energy into visible light that is seen by the wearer as an enhanced image reflected off the surface of the visor 130. Light enters through an entry port, travels along an optical path, and exits through an exit port where the image is viewable by the wearer.

Figure 2:
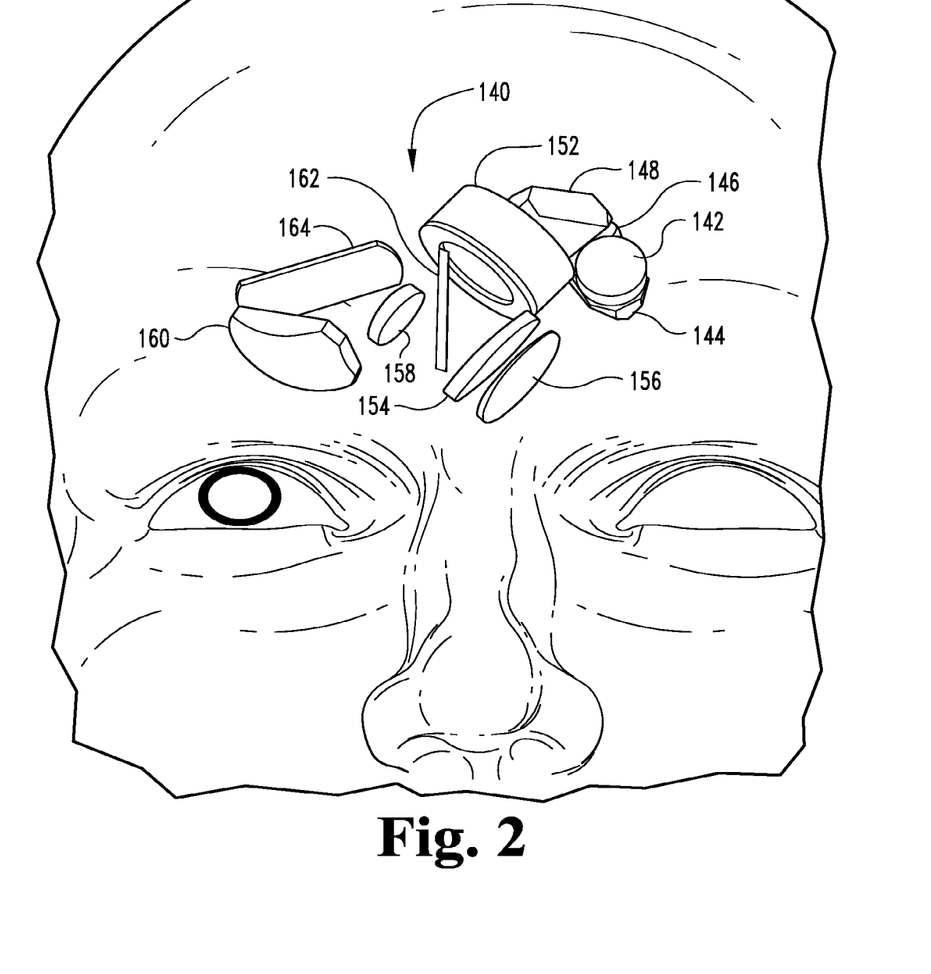
FIG. 2 is a front view of the optical arrangement according to the embodiment of FIG. 1.
Figure 3:
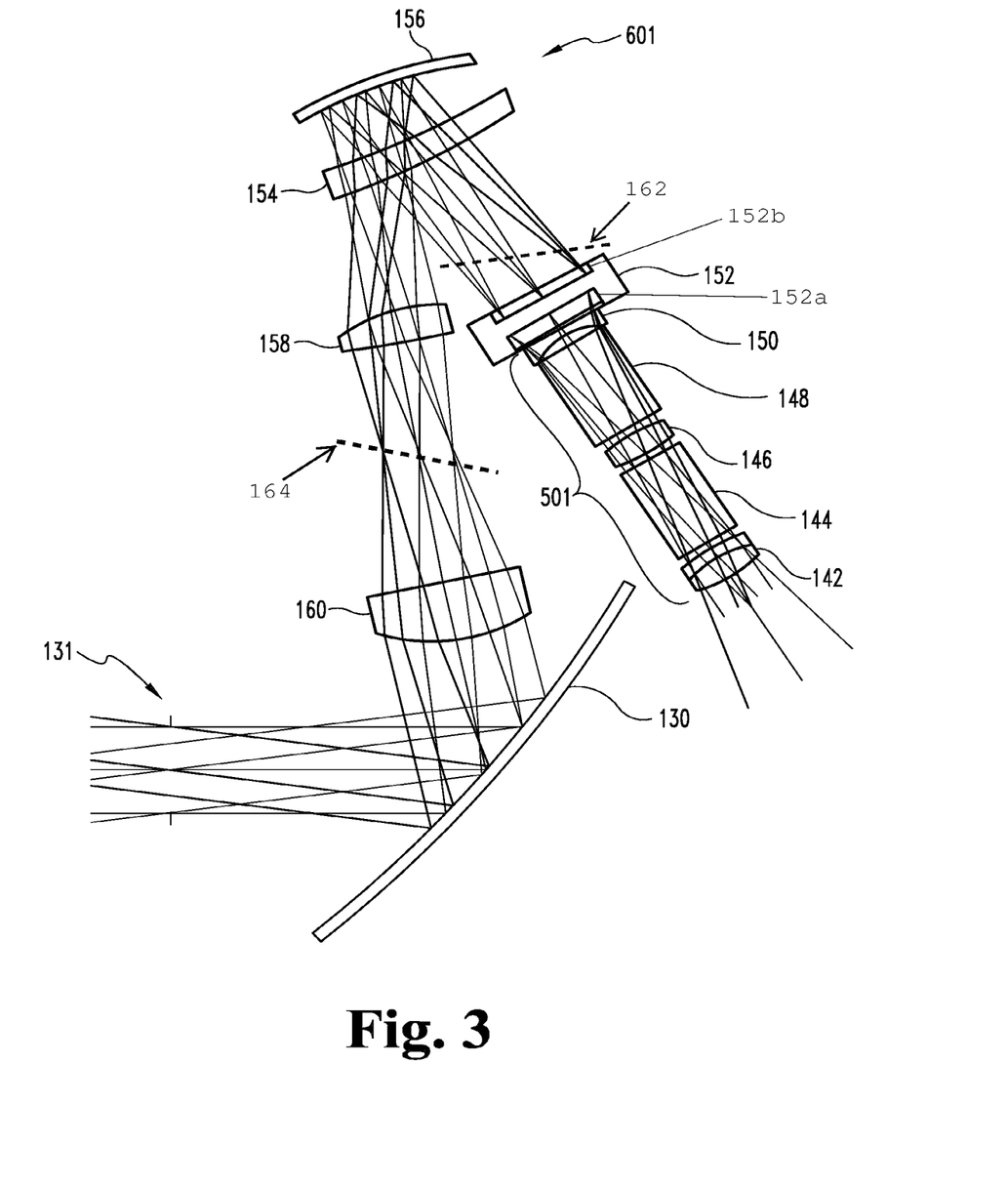
FIG. 3 is a schematic view of the optical system in the embodiment of FIG. 1, unfolded for clarity at two planar fold mirrors and at two fold prisms.

The components of optical module 140 are illustrated in more detail pictorially in FIG. 2 and schematically in FIG. 3. The optical module 140 comprises an objective lens subsystem 501, an image intensifier 152, and an eyepiece lens subsystem 601. The objective lens subsystem 501 comprises lens 142 (which is depicted as a doublet, but may optionally be a singlet lens, other type of lens, or other number of lenses as would be understood by one of ordinary skill in the art), an Amici reflector (for example, Amici fold prism 144), lens 146 (which is depicted as a singlet lens, but may optionally be a doublet, other type of lens, or other number of lenses as would be understood by one of ordinary skill in the art), another Amici reflector (for example, Amici fold prism 148), and field flattener lens 150; whereas the eyepiece lens subsystem 601 comprises flat mirror 162, lens 154, mirror 156 (which may be a flat mirror or a curved mirror, e.g., spherical, aspheric, hyperbolic, elliptical, parabolic, cylindrical, or toroid-shape), lens 158, flat mirror 164, and lens 160. For clarity of the schematic view in FIG. 3, the optical path through all flat fold mirrors and the Amici fold prisms is shown in the unfolded state, and the flat fold mirrors are represented by dashed lines representing a first flat folding mirror 162 and a second flat folding mirror 164.

In this embodiment, optical module 140 contains a total of five (5) optical folds: two in the objective lens subsystem 501 and three in the eyepiece lens subsystem 601. In addition to the folds in the optical module, one additional fold is provided by visor 130 resulting in a total of six (6) folds. These six (6) folds comprise a total of eight reflections (two (2) reflections in each of the two Amici prisms) which are even in number and, therefore, maintain the correct handedness (reversion) of the image with respect to the real world.

In addition to maintaining correct handedness, both directional and angular alignment of the intensified image to the real world must be maintained to a reasonable degree of accuracy. For example, some systems may require both directional and angular alignment to be held within one fourth of a degree (¼°), while other systems may require somewhat more or somewhat less than one fourth of a degree (¼°). If directional alignment is not sufficiently achieved, the user will see the intensified image displaced from where the real world image would appear. Although important in non-see-through systems, directional alignment can be particularly important in see-through systems where incomplete directional alignment will produce a type of double vision. Additionally, if angular alignment is not sufficiently achieved, the user will see the intensified image rotated with respect to how the real world image would appear.

In any see-through night vision system, directional alignment is attained when the optical axis entering the objective lens assembly is parallel with the optical axis exiting the eyepiece lens assembly, which, in some embodiments of the present invention, is the optical axis after reflection off the visor. However, angular (rotational) alignment is not necessarily maintained by maintaining the parallelism of these optical axes.

For systems where all the optical folds lie within a common plane (i.e., all optical folds between the entrance pupil of the objective lens assembly (sometimes referred to as the entry port) and the entrance pupil of the eye lie within a common plane), the image as seen by the eye will be either rotationally aligned to the real world or rotated 180°. For systems where one or more of the optical folds fall outside a common plane (i.e., the optical path defines at least two nonparallel planes), the image as seen by the eye may be rotationally misaligned with the real world anywhere from 0° to 360°, the angular misalignment depending upon the particular physical configuration. For any of these systems, provided that the fold angles required to correct the image misalignment fall within a reasonable range, conventional methods (e.g., methods that employ conventional flat fold mirrors) can be used to correct both directional and angular misalignment. However, various constraints (such as when using optical folds to achieve spatial compactness) can induce directional and rotational misalignments too large to correct with known conventional methods.

With regard to at least one embodiment of the present invention, the optical folds within the eyepiece lens subsystem are constrained by specific mechanical packaging and/or geometric considerations, as well as other factors including optical performance. The net result is that the optical fold angles within the eyepiece lens subsystem induce an image rotation that must be compensated for, such as by another rotation induced by the fold angles within the objective lens subsystem, to present an image to the user that is rotationally aligned with the real world. However, the angular image rotation induced in many of these embodiments is too great to compensate for using known conventional methods, such as by using simple flat fold mirrors, while full compensation can still be achieved using Amici reflectors as described herein.

In situations where full rotational correction of the image cannot be achieved using two (2) flat fold mirrors, Amici reflectors can be used. By using Amici reflectors, the starting point of the fold angle adjustment range can be effectively shifted. A benefit of using Amici reflectors is that the image can be shifted, both directionally and angularly, by adjusting the fold angles of the Amici reflectors. In this way, adjustment of the fold angles of the two (2) Amici reflectors permit complete and precise directional and angular alignment of the intensified image to the real world as seen by the eye of the wearer.

Embodiments of this invention include at least one Amici reflector with a fold angle unequal to (other than) ninety degrees (90°), although it should be appreciated that in some embodiments there may be at least one Amici reflector with a fold angle equal to ninety degrees (90°).

For some embodiments, the fold angle of at least one Amici reflector is between forty degrees (40°) and eighty-nine degrees (89°) inclusively. In other embodiments the fold angle of at least one Amici reflector is between forty-five degrees (45°) and eighty-five degrees (85°) inclusively. In further embodiments, the fold angle of at least one Amici reflector is approximately fifty degrees (50°), and in still further embodiments the fold angle of at least one Amici reflector is approximately seventy-five degrees (75°). ("Inclusively" indicates that the limits of the range, e.g. forty degrees (40°) and eighty-nine degrees (89°), are included).

In further embodiments, the fold angle of at least one Amici reflector is between ninety-one degrees (91°) and one hundred twenty degrees (120°) inclusively, while in other embodiments the fold angle of at least one Amici reflector is between ninety-five degrees (95°) and one hundred degrees (100°) inclusively.

Depicted in FIGS. 1-5 is an optical subsystem (for example, objective lens subsystem 501) with two Amici reflectors (for example, Amici prism 144 and Amici prism 148) that properly orient the image with non-perpendicular fold angles. In one embodiment, the fold angle of one Amici reflector is approximately seventy-five degrees (75°) and the fold angle of the other Amici reflector is approximately fifty degrees (50°). In another embodiment, the fold angle of one Amici reflector is seventy-six degrees (76) and the fold angle of the other Amici reflector is forty-eight and 8/10 degrees (48.8°). The physical configuration of the optical system can also influence the fold angle adjustment limits.

When the fold angle of one reflector in a two reflector objective lens assembly is set to ninety degrees (90°), a subsequent change in the fold angle of the other reflector produces a one-to-one linear change in the angular orientation of the image. For example, in a two Amici reflector objective assembly with the fold angle of the first Amici reflector set to ninety degrees (90°), a change in the fold angle of the second Amici reflector produces an equal change in the angular orientation of the image (e.g., a twenty degree (20°) change in the fold angle of the second Amici reflector produces a twenty degree (20°) change in the angular orientation of the image). However, when the fold angle of one reflector in a two reflector objective lens assembly is set to a value other than ninety degrees (90°), a subsequent change in the fold angle of the other reflector produces a non-linear change in the angular orientation of the image. For example, in one embodiment of the invention with the fold angle of a first Amici reflector set to seventy degrees (70°), a change in the fold angle of the second Amici reflector from ninety degrees (90°) to seventy degrees (70°)—a 20° change—will produce a change in the angular orientation of the image of 30.3°. In contrast, a change in the fold angle of the second Amici reflector from ninety degrees (90°) to fifty degrees (50°)—a 40° change—will produce a change in the angular orientation of the image of 67.46°. In both of these examples, the optical axis entering the objective lens assembly and the optical axis exiting the eyepiece lens assembly are parallel to one another.

As shown in FIGS. 2 and 3, a lens 142 receives light from in front of the wearer. The light passes through Amici fold prism 144, lens 146, and another Amici fold prism 148 onto a field-flattening lens 150 and into the cathode (input) window 152a of image intensifier 152. In this embodiment, prism 144 and prism 148 are modified Amici, or "roof," prisms (said modified Amici prisms being defined as Amici prisms having fold angles other than ninety degrees (90°)) and, in combination with the lens 142, lens 146, and field flattener 150, focus an image on the image intensifier 152 with the correct position and orientation. Although FIG. 3 depicts the various lenses and two (2) Amici reflectors in specific locations relative to each other along the optical path, in other embodiments contemplated by this invention, the lenses and the Amici reflectors may be positioned at other locations relative to each other along the optical path.

In this embodiment, the image intensifier 152 has a 12-13 millimeter diameter image format with a thin glass cathode (input) window 152a (one example including a second generation (multi-alkali) cathode window) and a thin glass anode (output) window 152b. Note that the fiber optic twister that is used for the output window in certain existing night vision devices, which adds considerable size and expense, is not needed in the present embodiment because of the rotation achieved by the Amici reflectors (e.g., Amici prisms). Nevertheless, it should be appreciated that fiber optic output windows that either rotate or do not rotate the output image are compatible and may be used in embodiments of the present invention, including the present embodiment.

Alternate embodiments include other types of image intensifiers, which may include different variations of size, weight, cost, commercialization potential, power consumption, and daylight protection. Other embodiments may use different output windows, glass-type output (anode) windows offer substantially higher transmission of light from the phosphor than military-type fiber-optics-based windows. The higher transmission from the glass-type output window can offset some of the losses inherent with the use of a smaller aperture provided by some objective lenses or a lower gain provided by some image intensifiers, such as second-generation image intensifiers. Some embodiments, for example, provide as much as 65-75% of the intensified field of view compared to some military night vision systems, but weigh only 1/10th of what those military night vision systems weigh. Alternate embodiments include output windows made of other materials, such as quartz and other crystals, that are, for example, optically clear, homogeneous, and/or monolithic.

Because of the higher gain that can result with image intensifiers that use a glass-type output window, the aperture size of objective lens subsystem 501 may be considerably smaller than existing night vision systems while still maintaining equal brightness to the eye. The smaller aperture size allows for a smaller, less bulky, and lighter night vision device. Embodiments of the present invention are capable of operating with apertures equal to 1/1.8, 1/2, and 1/2.5 of the focal length of the objective lens subsystem or smaller. Stated differently, embodiments of the present invention include an objective lens subsystem with an F-number relative aperture of 1.8, 2.0, 2.5 or greater.

The image produced by the image intensifier 152 passes through lens 154 (preferably a thin, plastic, meniscus-type "corrector" lens) both before and after it is reflected off mirror 156 (which may be a flat mirror or a curved mirror, e.g., spherical, aspheric, hyperbolic, elliptical, parabolic, cylindrical, or toroid-shape). In this embodiment, the combination of the mirror 156 and lens 154 corrects for astigmatism and distortion that is produced by the tilted spherical visor/reflector 130. The mirror 156 in this embodiment is preferably a spherical front surface mirror, but can also be a rear surface mirror so as to act as a Margin mirror. It can be made of any suitable material, even plastic. Lens 158 in this embodiment is matched with lenses 160 and 154 to place and collimate the intensified image at the pupil 131 of the user's eye. Lenses 160, 158, and 154 are plastic lenses in this embodiment, and an intermediate image appears between lens 160 and lens 158. The various lenses and mirrors of the system can be made of glass, plastic, or any other suitable material. Employing a combination of different plastics for the various lenses and mirrors provides good achromatization of the system, reducing the need for bulkier, heavier glass-type achromats.

Finally, the image reflects off the visor 130 of the night vision glasses 100 and to the pupil 131 of the observer. Visor 130 in this embodiment is curved, for example, spherically curved. In other embodiments, visor 130 is aspheric, parabolic, or toroidal in shape, or still another shape, including flat, as will occur to those skilled in the art. Further, visor 130 in this embodiment normally has uniform reflectivity, partial reflectivity, or reflectivity that varies vertically as in the lenses of some conventional sunglasses. The design with a spherical visor is more flexible and less sensitive to minor variations in manufacturing than certain other designs.

Lenses 154 and 160 are preferably made of a light plastic material, such as acrylic or polycarbonate, though other lens materials can be used as will occur to those skilled in the art. Likewise, mirror 156 may be spherical, aspheric, parabolic, toroidal, or another shape, including flat, to form a suitable combination with lens 154 and the rest of the system. In various embodiments, mirror 156 is made of plastic, glass, metal, or other materials as will appear to those skilled in the art. Mirrors 156, 162, and 164 may even be made using a replication process.

Lens 158 is preferably a polystyrene or polycarbonate type of plastic. Some of these plastic materials are made/distributed by companies such as General Electric. Other lenses may be used in other embodiments, as will occur to those skilled in the art.

Visor 130 is also preferably plastic and in various embodiments is tinted, untinted, treated with variable and/or light-sensitive dynamic tinting, or coated with a thin film reflection coating on one side. This thin film could be applied to a whole side, or to just a patch. The visor is preferably made of polycarbonate plastic or another shatterproof material for improved eye safety, and is attached to the frame 110 using any of a variety of means that will occur to those skilled in the art.

Figure 4:
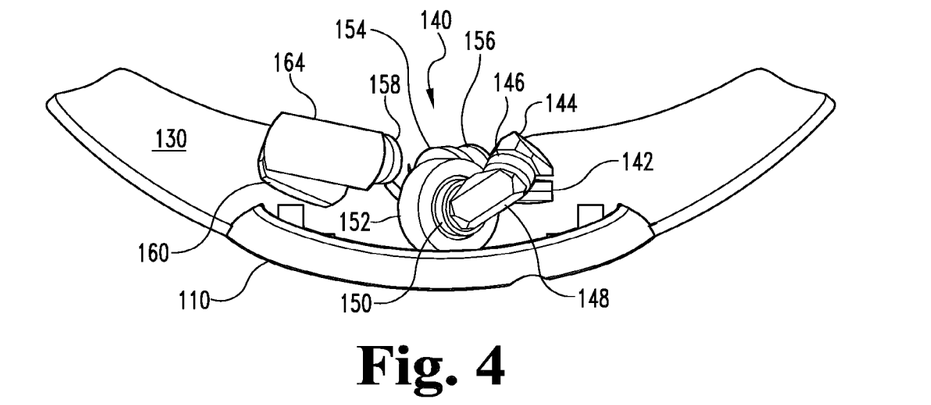
FIG. 4 is a top view of the optical arrangement in the embodiment of FIG. 1.
Figure 5:
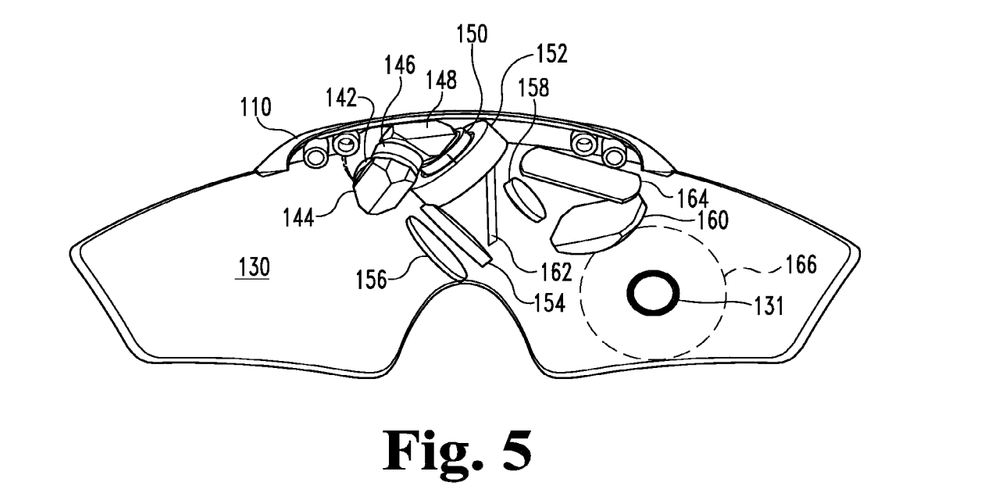
FIG. 5 is a rear view of the optical arrangement in the embodiment of FIG. 1.

FIG. 4 shows a top view of the optical arrangement of night vision glasses 100 in one embodiment of an optical system for projecting an intensified image onto the right side of the glasses (as viewed from the rear), while FIG. 5 shows a rear view of the same embodiment. The various optical folds throughout the optical system achieve improved spatial compactness. In particular, this embodiment includes planar folding mirror 162 (positioned along the optical path between image intensifier 152 and lens 154), planar folding mirror 164 (positioned along the optical path between lenses 158 and 160), mirror 156, and fold prisms 144 and 148. As shown in FIG. 5, the intensified image reflects off region 166 of visor 130 to a pupil 131 of a user.

To summarize, the embodiment illustrated in FIG. 1, and schematically depicted in FIG. 3, includes an image intensifying system that uses an objective lens subsystem 501 that employs two Amici reflectors (which can be defined by either Amici prisms or Amici mirrors), an image intensifier that utilizes a simple glass output window instead of a fiber optic window, and an eyepiece lens subsystem 601 that, combined with the visor 130, projects the intensified image to the user's eye, such as may be described in U.S. Provisional Application No. 61/036,281 and U.S. Pat. No. 7,791,809.

Figure 6:
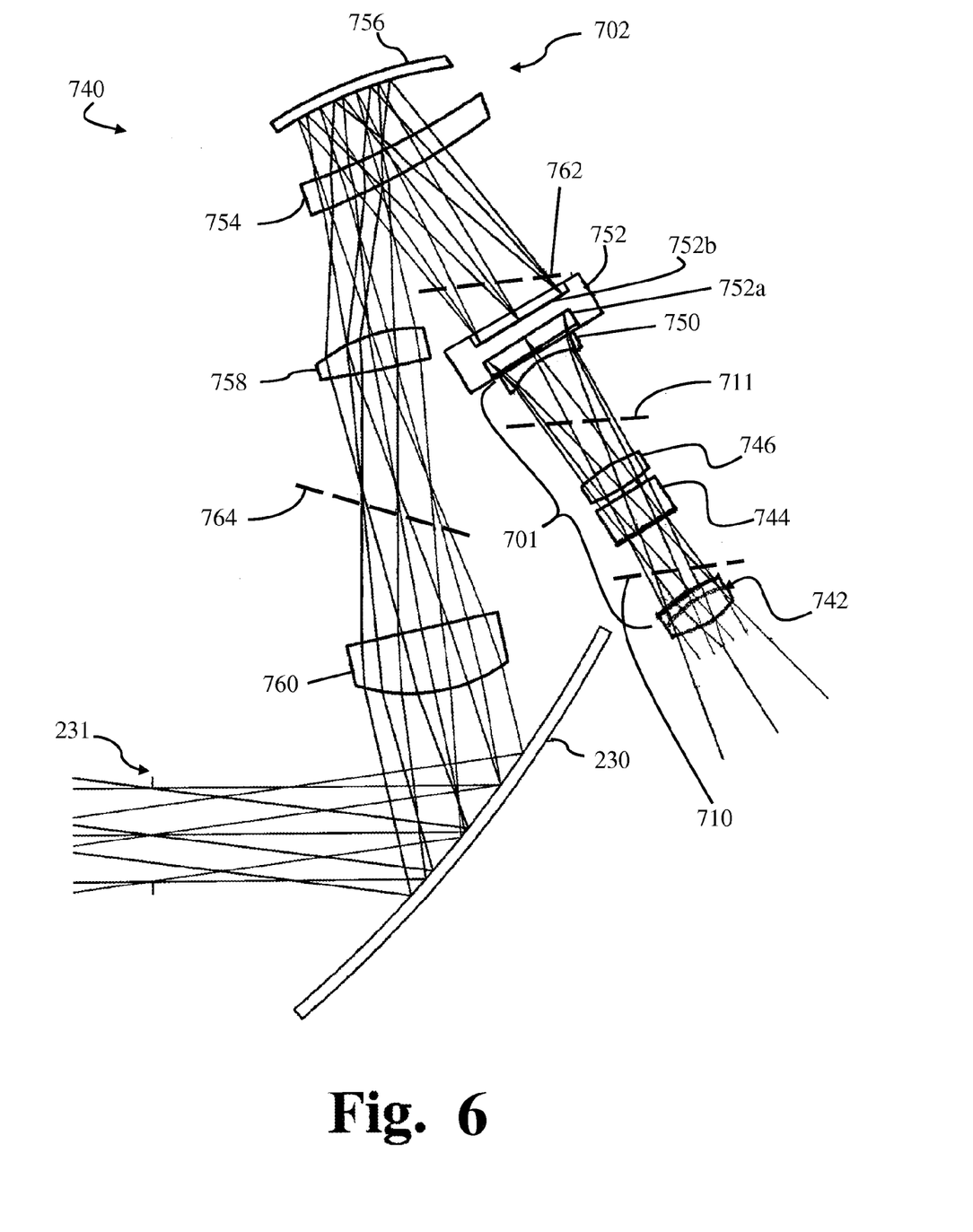
FIG. 6 is a schematic view of an optical system according to another preferred embodiment of the invention.

Depicted in FIG. 6 is a schematic representation of an optical module 740 according to another preferred embodiment of the present invention. Optical module 740 is preferably connected to a pair of glasses or a visor arrangement similar to glasses 100 and/or visor 130 depicted in FIGS. 1-5. Optical module 740 converts received low light level energy into visible light that is seen by the wearer (e.g., the wearer's pupil 231) as an enhanced image reflected off the surface of visor 230.

Optical module 740 preferably includes an objective lens subsystem 701, an image intensifier 752, and an eyepiece lens subsystem 702. In this embodiment, the objective lens subsystem 701 includes lens 742 (which is depicted as a doublet, but may optionally be a singlet lens, other type of lens, or other number of lenses as would be understood by one of ordinary skill in the art), a mirror (for example, flat fold mirror 710), a prism (for example, Amici fold prism 744), lens 746 (which is depicted as a singlet lens, but may optionally be a doublet, other type of lens, or other number of lenses as would be understood by one of ordinary skill in the art), another mirror (for example, flat fold mirror 711), and field flattener lens 750. The eyepiece lens subsystem 702 includes mirror 762 (which is, for example, a flat fold mirror), lens 754, mirror 756 (which may be a flat mirror or a curved mirror, e.g., spherical, aspheric, hyperbolic, elliptical, parabolic, cylindrical, or toroid-shape), lens 758, mirror 764 (which is, for example, a flat mirror), and lens 760. For clarity of the schematic view of FIG. 6, the optical path through all flat fold mirrors and the Amici fold prism is shown in the unfolded state, and the flat fold mirrors are represented by dashed lines representing flat folding mirrors 710, 711, 762 and 764.

In this embodiment, optical module 740 contains a total of six (6) optical folds: three (3) in the objective lens subsystem 701 and three (3) in the eyepiece lens subsystem 702. In addition to the folds in the optical module 740, one additional fold is provided by visor 230 resulting in a total of seven (7) folds. These seven (7) folds comprise a total of eight (8) reflections (two (2) reflections in the Amici fold prism), which are even in number and maintain the correct handedness (reversion) of the image with respect to the real world.

In addition to maintaining correct handedness, both directional and angular alignment of the intensified image to the real world must be maintained to a reasonable degree of accuracy. For example, some systems may require both directional and angular alignment to be held within one fourth of a degree (¼°), while other systems may require somewhat more or somewhat less than one fourth of a degree (¼°). If directional alignment is not sufficiently achieved, the user will see the intensified image displaced from where the real image would appear. Although important in non-see-through systems, directional alignment can be particularly important in see-through systems where incomplete directional alignment will produce a type of double vision. Additionally, if angular alignment is not sufficiently achieved, the user will see the intensified image rotated with respect to how the real world image would appear.

In any see-through night vision system, directional alignment is attained when the optical axis entering the objective lens assembly is parallel with the optical axis exiting the eyepiece lens assembly, which, in some embodiments of the present invention, is the optical axis after reflection off the visor. However, angular (rotational) alignment is not necessarily maintained by maintaining the parallelism of these optical axes.

For systems where all the optical folds lie within a common plane (i.e., all optical folds between the entrance pupil of the objective lens assembly and the entrance pupil of the eye lie within a common plane), the image as seen by the eye will be either rotationally aligned to the real world or rotated 180°. For systems where one or more of the optical folds fall outside a common plane, the image as seen by the eye may be rotationally misaligned to the real world anywhere from 0° to 360°, the angular misalignment depending upon the particular physical configuration. For any of these systems, provided that the fold angles required to correct the image misalignment fall within a reasonable range, conventional methods (e.g., methods that employ conventional flat fold mirrors) can be used to correct both directional and angular misalignment. However, various constraints (such as when using optical folds to achieve spatial compactness) can induce directional and rotational misalignments too large to correct with known conventional methods.

With regard to at least one embodiment of the present invention, the optical folds within the eyepiece lens subsystem are constrained by specific mechanical packaging and/or geometric considerations, as well as other factors including optical performance. The net result is that the optical fold angles within the eyepiece lens subsystem induce an image rotation that must be compensated for, such as by another rotation induced by the fold angles within the objective lens subsystem, to present an image to the user that is rotationally aligned with the real world. However, the angular image rotation induced in many of these embodiments is too great to compensate for using known conventional methods, such as by using simple flat fold mirrors, while full compensation can still be achieved by adding an Amici reflector as described herein.

In situations where full rotational correction of the image cannot be achieved using two (2) flat fold mirrors, one Amici reflector can be added to the two (2) flat fold mirrors. By using the Amici reflector, the starting point of the fold angle adjustment range can be effectively shifted. A benefit of adding the Amici reflector is that the image can be shifted, both directionally and angularly, by adjusting the fold angles of the Amici reflector and the two (2) flat fold mirrors. In this way, adjustment of the fold angles of the one (1) Amici reflector and the two (2) flat fold mirrors permits complete and precise directional and angular alignment of the intensified image to the real world as seen by the eye of the wearer.

In some embodiments of this invention, the fold angle of at least one of the reflectors, said reflectors comprising one Amici reflector and the two (2) flat fold mirrors, is unequal to (other than) ninety degrees (90°), although it should be appreciated that in some embodiments there may be at least one reflector with a fold angle equal to ninety degrees (90°).

For some embodiments, the fold angle of the Amici reflector and/or at least one flat fold mirror is between forty degrees (40°) and eighty-nine degrees (89°) inclusively. In other embodiments the fold angle of the Amici reflector and/or at least one flat fold mirror is between forty-five degrees (45°) and eighty-five degrees (85°) inclusively. In further embodiments, the fold angle of the Amici reflector and/or at least one flat fold mirror is approximately fifty degrees (50°), and in still further embodiments the fold angle of at least one Amici reflector is approximately seventy-five degrees (75°).

In further embodiments, the fold angle of the Amici reflector and/or at least one flat fold mirror is between ninety-one degrees (91°) and one hundred twenty degrees (120°) inclusively, while in other embodiments the fold angle of the Amici reflector and/or at least one flat fold mirror is between ninety-five degrees (95°) and one hundred degrees (100°) inclusively. The physical configuration of the optical system can also influence the fold angle adjustment limits.

When the fold angle of two (2) reflectors in a three (3) reflector objective lens assembly, said three (3) reflectors comprising one Amici reflector and two (2) flat fold mirrors, are set to ninety degrees (90°), a subsequent change in the fold angle of the third reflector produces a one-to-one linear change in the angular orientation of the image. For example, in a three reflector objective lens assembly with two (2) of the fold angles set to ninety degrees (90°), a change in the fold angle of the third reflector produces an equal change in the angular orientation of the image (e.g., a twenty degree (20°) change in the fold angle of the third reflector produces a twenty degree (20°) change in the angular orientation of the image). However, when the fold angle of one reflector in a three (3) reflector objective lens assembly is set to a value other than ninety degrees (90°), and the fold angle of one of the other reflectors is held fixed, a subsequent change in the fold angle of the remaining reflector can produce a non-linear change in the angular orientation of the image. For example, in one embodiment of the invention, with the fold angle of a first reflector set to seventy degrees (70°) and holding the fold angle of a second reflector fixed, a change in the fold angle of the third reflector from ninety degrees (90°) to seventy degrees (70°)—a 20° change—will produce a certain change in the angular orientation of the image, say 30 degrees (30°). However, doubling the change in the fold angle of the third reflector from ninety degrees (90°) to fifty degrees (50°)—a 40° change—will not double the change in the angular orientation of the image, i.e., the change will be other than 60 degrees (60°). In both of these examples, the optical axis entering the objective lens assembly and the optical axis exiting the eyepiece lens assembly are parallel to one another.

In operation, lens 742 receives light from out in front of the wearer. The light reflects off a flat fold mirror 710, passes through Amici fold prism 744 and then proceeds through lens 746, reflects off flat fold mirror 711, and finally passes through field flattening lens 750. Thereafter, the light passes into the cathode (input) window 752*a* of image intensifier 752, which then causes an image to be formed at the anode (output) window 752*b*.

In the illustrated embodiment, prism 744 is an Amici prism, which is also commonly referred to as a "roof" prism. Prism 744, the two mirrors 710 and 711, lenses 742 and 746, and field flattener 750 focus an image with the correct position and orientation on the image intensifier 752. Although FIG. 6 depicts the various lenses, one (1) Amici reflector and two (2) flat fold mirrors in specific locations relative to each other along the optical path, in other embodiments contemplated by this invention, the lenses, the Amici reflector and the flat fold mirrors may be positioned at other locations relative to each other along the optical path.

In the embodiment shown in FIG. 6, image intensifier 752 has a 12-13 millimeter diameter image format with a thin glass cathode (input) window (one example including a second generation (multi-alkali) cathode window) and a thin glass anode (output) window. Note that the fiber optic twister that is used for the output window in certain existing night vision devices, which adds considerable size and expense, is not needed in the present embodiment because of the rotation achieved by the Amici reflector (e.g., Amici prism). Nevertheless, it should be appreciated that fiber optic output windows that either rotate or do not rotate the output image are compatible and may be used in embodiments of the present invention, including the present embodiment.

Alternate embodiments include other types of image intensifiers, which may include different variations of size, weight, cost, commercialization potential, power consumption, and daylight protection. Other embodiments may use different output windows, glass-type output (anode) windows offer substantially higher transmission of light from the phosphor than military-type fiber-optics-based windows. The higher transmission from the glass-type output window can offset some of the losses inherent with the use of a smaller aperture provided by some objective lenses or a lower gain provided by some image intensifiers, such as second-generation image intensifiers. Some embodiments, for example, provide as much as 65-75% of the intensified field of view compared to some military night vision systems, but weigh only ⅒th of what those military night vision systems weigh. Alternate embodiments include output windows made of other materials, such as quartz and other crystals, that are, for example, optically clear, homogeneous, and/or monolithic.

Because of the higher gain that can result with image intensifiers that use a glass-type output window, the aperture size of objective lens subsystem 701 may be considerably smaller than existing night vision systems while still maintaining equal brightness to the eye. The smaller aperture size allows for a smaller, less bulky, and lighter night vision device. Embodiments of the present invention are capable of operating with apertures equal to 1/1.8, 1/2 and 1/2.5 of the focal length of the objective lens subsystem or smaller. Stated differently, embodiments of the present invention include an objective lens subsystem with an F/number relative aperture of 1.8, 2.0, 2.5 or greater.

The image produced by the image intensifier 752 passes through lens 754 (which in the illustrated embodiment is a thin, plastic, meniscus-type "corrector" lens) before and after it is reflected off mirror 756 (which may be a flat mirror or a curved mirror, e.g., spherical, aspheric, hyperbolic, elliptical, parabolic, cylindrical, or toroid-shape). In one embodiment, the combination of mirror 756 and lens 754 corrects for astigmatism and distortion produced by the tilted visor/reflector 230. The mirror 756 in the illustrated embodiment is a spherical front surface mirror, but alternate embodiments include a mirror 756 that is a rear surface mirror so as to act as a Mangin mirror, and can be made of any suitable material (including plastic).

In the illustrated example embodiment, lens 758 is matched with lenses 760 and 754 to place and collimate the intensified image at the pupil 231 of the wearer's eye, and lenses 760, 758, and 754 can be plastic. In use, an intermediate image appears between lens 760 and lens 758. Employing a combination of different plastics for the various lenses and mirrors provides good achromatization of the system, and reduces the need for bulkier, heavier glass-type achromats.

After passing along the optical path and through lens 760, the image reflects off the visor 230 of the night vision glasses and to the pupil 231 of the wearer. Visor 230 in this embodiment is curved, for example, spherically curved. In other embodiments, visor 230 is aspheric, parabolic, or toroidal in shape, or still another shape, including flat, as will occur to those skilled in the art. In alternate embodiments, visor 230 has uniform reflectivity, partial reflectivity, or reflectivity that varies vertically as in the lenses of certain conventional sunglasses. In one embodiment, a spherical visor is used since it can be more flexible and less sensitive to minor variations in manufacturing than certain other designs.

Lenses 754 and 760 are made of a light plastic material, such as acrylic or polycarbonate, although other lens materials can be used as will occur to those ordinarily skilled in the art. Likewise, mirror 756 may be spherical, aspheric, parabolic, toroidal, or another shape, including flat, to form a suitable combination with lens 754 and the rest of the system. In various embodiments, mirror 756 is made of plastic, glass, metal, or other materials as will appear to those skilled in the art. Mirrors 756, 762, and 764 may even be made using a replication process.

Lens 758 is preferably constructed from a polystyrene or polycarbonate type of plastic, although other embodiments utilize different materials as would occur to those skilled in the art. Some of these suitable plastic materials are made/distributed by companies such as General Electric.

The preferred visor 230 can be plastic, and can also be tinted, untinted, treated with variable and/or light-sensitive dynamic tinting, or coated with a thin film reflection coating on one side. This thin film can be applied to a whole side, or to just a patch. In some embodiments, the visor is made of polycarbonate plastic or another shatterproof material for improved eye safety. The visor is preferably attached to a frame (see, for example, frame 110 in FIGS. 1, 4 and 5) using any of a variety of means that will occur to those skilled in the art.

The embodiment shown in FIG. 6 includes an image intensifying system that uses an objective lens subsystem 701 employing one (1) Amici prism and (2) two flat fold mirrors, an image intensifier that utilizes a simple glass output window instead of a fiber optic window, and an eyepiece lens subsystem 702 that, when combined with the visor 230, projects the intensified image to the user's eye.

Figure 7:
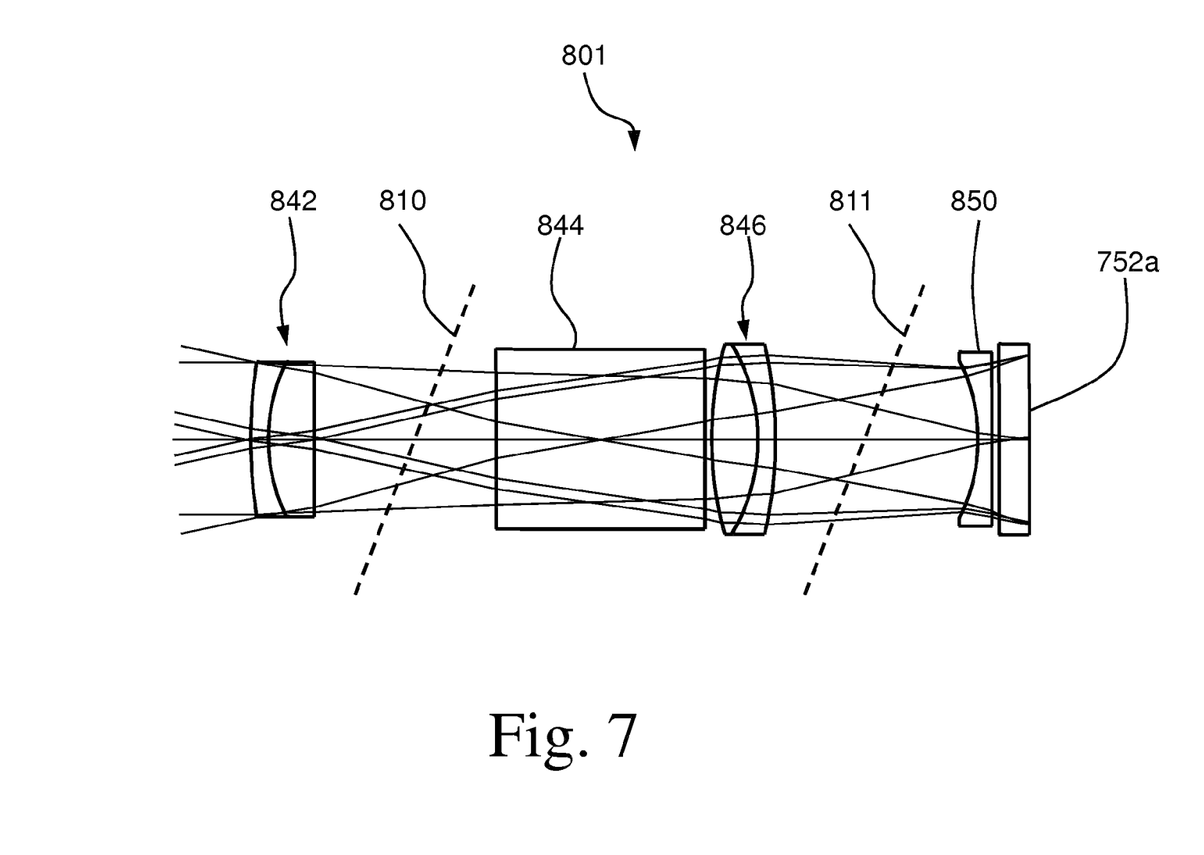
FIG. 7 is a schematic view of an objective lens subsystem according to another preferred embodiment of the invention.

Depicted in FIG. 7 is a schematic representation of an objective lens system 801 according to a preferred embodiment of the invention. Objective lens system 801 may be used in place of objective lens subsystem 701 in the optical module 740 depicted in FIG. 6, or may be used with other optical systems. Objective lens system 801 includes lens 842 (which is depicted as a doublet, but may optionally be a singlet lens, other type of lens, or other number of lenses as would be understood by one of ordinary skill in the art), a mirror (for example, flat fold mirror 810), an Amici reflector (for example, Amici prism 844), lens 846 (which is depicted as a doublet, but may optionally be a singlet lens, other type of lens, or other number of lenses as would be understood by one of ordinary skill in the art), another mirror (for example, flat fold mirror 811), and field flattener lens 850. For clarity of the schematic view of FIG. 7, the optical path through the flat mirrors and the Amici prism is shown in the unfolded state, and the flat fold mirrors 810 and 811 are represented by dashed lines.

In operation, lens 842 receives light from out in front of the wearer. The light reflects off a flat fold mirror 810, passes through Amici prism 844 and then proceeds through lens 846, reflects off flat fold mirror 811, and finally passes through field flattening lens 850. Thereafter, the light passes into the cathode (input) window 752*a* of image intensifier 752, which then causes an image to be formed at the anode (output) window 752*b*. The distance along the light path between entering lens 842 and exiting entering cathode (input) window 752*a* is approximately 50 to 54 millimeters in one example embodiment, and approximately 52 millimeters in another example embodiment.

Figure 8:
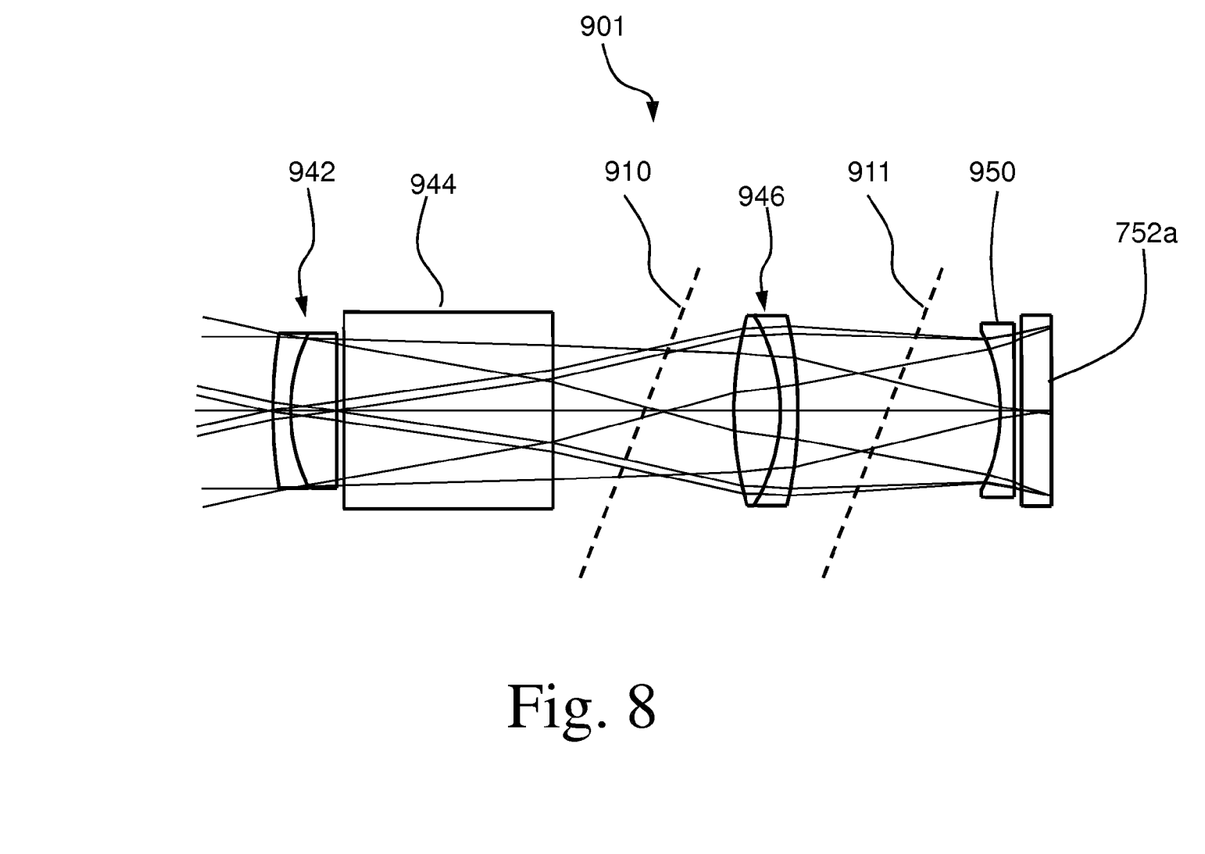
FIG. 8 is a schematic view of another objective lens subsystem according to yet another preferred embodiment of the invention.

Depicted in FIG. 8 is a schematic representation of an objective lens system 901 according to another preferred embodiment of the invention. Objective lens system 901 may be used in place of objective lens subsystem 701 in the optical module 740 depicted in FIG. 6, or may be used with other optical systems. Objective lens system 901 includes lens 942 (which is depicted as a doublet, but may optionally be a singlet lens, other type of lens, or other number of lenses as would be understood by one of ordinary skill in the art), an Amici reflector (for example, Amici prism 944), a mirror (for example, flat fold mirror 910), lens 946 (which is depicted as a doublet, but may optionally be a singlet lens, other type of lens, or other number of lenses as would be understood by one of ordinary skill in the art), another mirror (for example, flat fold mirror 911), and field flattener lens 950. For clarity of the schematic view of FIG. 8, the optical path through the flat mirrors and the Amici prism is shown in the unfolded state, and the flat fold mirrors 910 and 911 are represented by dashed lines.

In operation, lens 942 receives light from out in front of the wearer. The light passes through Amici prism 944, reflects off a flat fold mirror 910, passes through lens 946, reflects off flat fold mirror 911, and finally passes through field flattening lens 950. Thereafter, the light passes into the cathode (input) window 752*a* of image intensifier 752, which then causes an image to be formed at the anode (output) window 752*b*. In one embodiment, the distance along the light path between entering lens 942 and exiting entering cathode (input) window 752*a* is approximately 52 millimeters.

Figure 9:
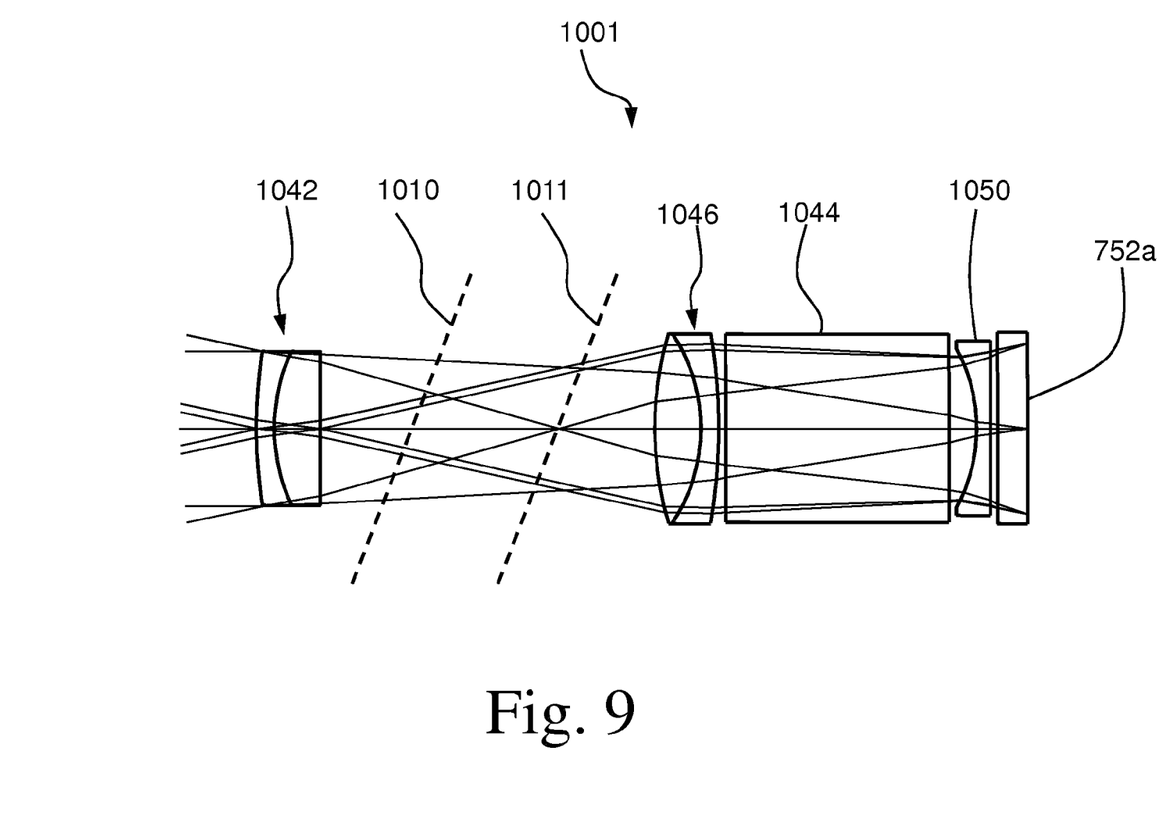
FIG. 9 is a schematic view of another objective lens subsystem according to still another preferred embodiment of the invention.

Depicted in FIG. 9 is a schematic representation of an objective lens system 1001 according to still another preferred embodiment of the invention. Objective lens system 1001 may be used in place of objective lens subsystem 701 in the optical module 740 depicted in FIG. 6, or may be used with other optical systems. Objective lens system 1001 includes lens 1042 (which is depicted as a doublet, but may optionally be a singlet lens, other type of lens, or other number of lenses as would be understood by one of ordinary skill in the art), a mirror (for example, flat fold mirror 1010), another mirror (for example, flat fold mirror 1011), lens 1046 (which is depicted as a doublet, but may optionally be a singlet lens, other type of lens, or other number of lenses as would be understood by one of ordinary skill in the art), an Amici reflector (for example, Amici prism 1044), and field flattener lens 1050. For clarity of the schematic view of FIG. 9, the optical path through the flat mirrors and the Amici prism is shown in the unfolded state, and the flat fold mirrors 1010 and 1011 are represented by dashed lines.

In operation, lens 1042 receives light from out in front of the wearer. The light reflects off flat fold mirror 1010, reflects off flat fold mirror 1011, passes through lens 1046, passes through Amici prism 1044, and finally passes through field flattening lens 1050. Thereafter, the light passes into the cathode (input) window 752*a* of image intensifier 752, which then causes an image to be formed at the anode (output) window 752*b*. In one embodiment, the distance along the light path between entering lens 1042 and exiting entering cathode (input) window 752*a* is approximately 52 millimeters.

To summarize, the embodiments illustrated in FIGS. 6-9, each include an objective lens subsystem that employs one Amici reflector (which can be defined by either an Amici prism or Amici mirror) and two flat fold mirrors. These objective lens subsystems focus an image with the correct position and orientation on the input window of an image intensifier that utilizes a simple glass output window instead of a fiber optic window. The intensified image then passes through the eyepiece lens assembly, reflects off the visor, and is projected to the user's eye.

Embodiments of the present invention rotate an image by a non-perpendicular (non-90°) angle within a night vision device using one or more Amici reflectors. Alternate embodiments rotate an image by an angle other than one hundred eighty degrees (180°) within a night vision device using one or more Amici reflectors.

For example, some embodiments rotate an image by an angle between one degree (1°) and ten degrees (10°) inclusively within a night vision device using one or more Amici reflectors. As another example, alternate embodiments rotate an image by an angle between ten degrees (10°) and thirty degrees (30°) inclusively within a night vision device using one or more Amici reflectors. As a further example, embodiments rotate an image by an angle between 30 degrees (30°) and sixty degrees (60°) inclusively within a night vision device using one or more Amici reflectors. As a still further example, embodiments rotate an image by an angle between sixty degrees (60°) and eighty-nine degrees (89°) inclusively within a night vision device using one or more Amici reflectors. And still another example, embodiments rotate an image within a night vision device using one or more Amici reflectors by an angle included in at least one of the four ranges of angles enumerated immediately above plus or minus multiples of ninety degrees (90°).

Other embodiments of the present invention include methods for accurately registering an intensified image produced by a night vision device onto the non-intensified real world scene. An example method includes determining from the perspective of a user of a night vision device the differences between a non-intensified real world image (which can be received through a visor) and an intensified image produced by the night vision device (which can be reflected off a visor), and moving the intensified image, for example by adjusting the fold angle of an Amici reflector (or a flat fold mirror in a device with at least one Amici reflector), within the night vision device to decrease the differences between the non-intensified real world image and the intensified image produced by the night vision device as viewed from the perspective of the user. At least one example embodiment includes Amici fold angles (the angular difference between the light incident upon the Amici and the light emerging from the Amici) of ninety degrees (90°), while other example embodiments include Amici fold angles other than (unequal to) ninety degrees (90°), such as 76° and 48.8° as discussed previously.

Still another example embodiment includes determining the orientation of the Amici reflector within the night vision device to register the intensified image with the real world image as seen by the user (and which may include orientations in which the Amici reflector fold angle is other than ninety degrees (90°)), and producing a plurality of night vision devices, each of the plurality of night vision devices including the same or substantially similar orientation of the Amici reflector within each night vision device.

Additional embodiments of the present invention include methods of manufacturing one or more night vision devices. One example includes forming an objective lens subsystem by attaching: one or more lenses, first and second flat reflectors, one or more Amici reflectors, and an image intensifier together along an optical path. The example method can further include rotating the image (or the light propagating along the optical path in the objective lens subsystem) at an angle other than one hundred eighty degrees (180°) with the one or more Amici reflectors. The example method can also include attaching an image intensifier to the objective lens subsystem, the image intensifier receiving light that has passed through the objective lens subsystem and generating an intensified image of the received light. The example method may also include attaching an eyepiece lens subsystem to the image intensifier, the eyepiece lens subsystem receiving the intensified image and adapting the intensified image for viewing by a user.

Yet other embodiments of the present invention further include methods for intensifying light received from a lowlight environment. One example method includes receiving light into an objective lens system, the received light propagating along an optical path in the objective lens system, and initially refracting the light propagating along the optical path, and initially reflecting the light propagating along the optical path. The method may further include reverting and inverting the light propagating along the optical path. The method may also include rotating an image formed by the light propagating along the optical path at an angle other than one hundred eighty degrees (180°). The method may also include subsequently refracting the light propagating along the optical path after the light is initially refracted; subsequently reflecting light propagating along the optical path after the light is initially reflected; and flattening an image formed by the light propagating along the optical path. Embodiments can also include intensifying an image formed by the light propagating along the optical path, and may also include registering the intensified image onto the non-intensified real world scene.

In some of the above embodiments, the reverting and inverting of the light is performed by an Amici reflector. In other embodiments, the rotating is performed by an Amici reflector. In still other embodiments, the rotating is performed by an Amici reflector and two fold mirrors. In still further embodiments, the rotating is performed by two Amici reflectors. Alternate embodiments include Amici reflectors that deviate (fold) the light incident on the Amici by an angle unequal to ninety degrees (90°).

In still other of the above embodiments, the initial refracting of the light may be performed by a lens, the initial reflecting of the light may be performed by a fold mirror, the subsequent refracting of the light may be performed by a lens, the subsequent reflecting of the light may be performed by a fold mirror, and the flattening of an image may be performed by a field flattening lens.

In additional embodiments, the initial reflecting of the light may occur after the initial refracting of the light, the reverting and inverting of the light may occur after the initial reflecting of the light, the subsequent refracting of the light may occur after the reverting and inverting of the light, the subsequent reflecting of the light may occur after the subsequent refracting of the light, and the flattening of an image may occur after the subsequent reflecting of the light.

In still further embodiments, the methods include intensifying the light propagating along the optical path.

One or more of the Amici reflectors used in the various embodiments of the present invention described herein may be of the type that deviate the light incident on the Amici (also referred to as folding) by an angle equal to ninety degrees (90°). Moreover, one or more of the Amici reflectors used in the various embodiments described herein may be of the type that deviate (fold) the light incident on the Amici by angles other than (unequal to) ninety degrees (90°).

The lenses used in various embodiment of the present invention, which include the lenses in the objective and eyepiece assemblies, may be made of plastic (such as polystyrene or polycarbonate types of lenses), glass, or other suitable material as would be understood by one of ordinary skill in the art.

Although the one or more Amici reflectors have frequently been described as being associated with an objective lens subsystem, alternate embodiments include one or more Amici reflectors being included in other portions of a device, such as in the eyepiece. For example, in one embodiment, one Amici reflector is included in the objective subsystem while another Amici reflector is included in the eyepiece subsystem. In another example embodiment two Amici reflectors are included in the eyepiece subsystem.

Various Aspects of Different Embodiments of the Present Disclosure are Expressed in Paragraphs X1, X2 and X3 as Follows:

X1. One embodiment of the present disclosure includes a night vision apparatus comprising an optical subsystem with a first Amici reflector located along an optical path and an image intensifier connected to the optical subsystem and located along the optical path wherein the optical subsystem rotates an image entering the optical subsystem by an angle other than one hundred eighty degrees (180°) and other than a multiple of one hundred eighty degrees (180°).

X2. Yet another embodiment of the present disclosure includes a night vision apparatus comprising an optical subsystem with a first Amici reflector located along an optical path; and an image intensifier connected to the optical subsystem and located along the optical path wherein the fold angle of the first Amici reflector is other than ninety degrees (90°).

X3. Another embodiment of the present disclosure includes a night vision apparatus, comprising a light entry port and a light exit port connected to the light entry port, wherein light exiting the light exit port is viewable by a user; an optical path located between the light entry port and the light exit port; an image intensifier located along the optical path and connected to the light entry port; and an Amici reflector located along the optical path and connected to the light entry port; wherein the optical path defines at least two nonparallel planes.

Yet Other Embodiments Include the Features Described in any of the Previous Statements X1, X2 or X3, as Combined with One or More of the Following Aspects:

Wherein the fold angle of the first Amici reflector is other than ninety degrees (90°).

Wherein the first Amici reflector fold angle is approximately seventy-five degrees (75°).

Wherein the optical subsystem further includes a second Amici reflector.

Wherein the fold angle of the second Amici reflector is other than ninety degrees (90°).

Wherein the second Amici reflector fold angle is approximately fifty degrees (50°).

Wherein the first Amici reflector fold angle is approximately seventy-five degrees (75°).

Wherein the optical subsystem further includes two flat fold mirrors.

Wherein the fold angles of the Amici reflector and the two fold mirrors are other than ninety degrees (90°).

Wherein the optical subsystem delivers the rotated image to the image intensifier.

Wherein the optical subsystem has an F/number relative aperture of 2.0 or greater.

Wherein the image intensifier includes an output window made of an optically clear, monolithic structure.

Wherein the optically clear, monolithic structure is glass, or a crystal such as quartz.

Wherein the image intensifier includes a fiber optic output window that rotates the output image.

Wherein the image intensifier includes a fiber optic output window that does not rotate the output image.

Wherein the image intensifier is a second-generation image intensifier.

Wherein the image is rotated by a non-perpendicular (non-90°) angle within the night vision apparatus.

Wherein the image is rotated by an angle other than one hundred eighty degrees (180°) within the night vision apparatus.

Wherein the image is rotated by an angle between one degree (1°) and ten degrees (10°) inclusively within the night vision apparatus.

Wherein the image is rotated by an angle between ten degrees (10°) and thirty degrees (30°) inclusively within the night vision apparatus.

Wherein the image is rotated by an angle between 30 degrees (30°) and sixty degrees (60°) inclusively within the night vision apparatus.

Wherein the image is rotated by an angle between sixty degrees (60°) and eighty-nine degrees (89°) inclusively within the night vision apparatus.

Wherein the image is rotated within the night vision apparatus by an angle included in at least one of the four ranges of angles enumerated immediately above plus or minus multiples of ninety degrees (90°).

Wherein the optical folds along the optical path do not fall within a common plane.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A see-through night vision apparatus, comprising:
   an optical subsystem with a first Amici reflector that has a first fold angle, the first Amici reflector is located along an optical path; and an image intensifier connected to the optical subsystem and located along the optical path;
   the optical subsystem further includes at least two flat fold mirrors, each having their respective fold angle, and which are located along the optical path;
   wherein the optical subsystem rotates an image entering the optical subsystem by an angle other than one hundred eighty degrees (180°) and other than a multiple of one hundred eighty degrees (180°), such to align the image with the real-world.

2. The see-through night vision apparatus of claim 1, wherein the fold angle of the first Amici reflector is other than ninety degrees (90°).

3. The see-through night vision apparatus of claim 2, wherein the first Amici reflector fold angle is approximately seventy-five degrees (75°).

4. The see-through night vision apparatus of claim 2, wherein the optical subsystem further includes a second Amici reflector, located along the optical path, wherein the second Amici reflector has a second fold angle.

5. The see-through night vision apparatus of claim 4, wherein the fold angle of the second Amici reflector is other than ninety degrees (90°).

6. The see-through night vision apparatus of claim 5, wherein the second Amici reflector fold angle is approximately fifty degrees (50°).

7. The see-through night vision apparatus of claim 6, wherein the first Amici reflector fold angle is approximately seventy-five degrees (75°).

8. The see-through night vision apparatus of claim 1, wherein the fold angles of the first Amici reflector, the second Amici reflector, and the two fold mirrors are other than ninety degrees (90°).

9. The see-through night vision apparatus of claim 1, wherein the optical subsystem delivers a rotated image to the image intensifier.

10. The see-through night vision apparatus of claim 9, wherein the optical subsystem has an F/number relative aperture of 2.0 or greater.

11. The see-through night vision apparatus of claim 1, wherein the image intensifier includes an output window made of an optically clear, monolithic structure.

12. The see-through night vision apparatus of claim 11, wherein the optically clear, monolithic structure is glass, or a crystal such as quartz.

13. The see-through night vision apparatus of claim 1, wherein the image intensifier includes a fiber optic output window that rotates the output image.

14. The see-through night vision apparatus of claim 1, wherein the image intensifier includes a fiber optic output window that does not rotate the output image.

15. The see-through night vision apparatus of claim 1, wherein the image intensifier is a second-generation image intensifier.

16. A see-through night vision apparatus, comprising:
an optical subsystem with a first Amici reflector that has a first fold angle, the Amici reflector is located along an optical path; and an image intensifier connected to the optical subsystem and located along the optical path;
the optical subsystem further includes at least two flat fold mirrors, each having their respective fold angle, and which are located along the optical path;
wherein either one of the first fold angle, and the second fold angle is other than ninety degrees (90°) so as to align an image entering the optical subsystem with the real-world.

17. The see-through night vision apparatus of claim 16, wherein the first Amici reflector fold angle is approximately seventy-five degrees (75°).

18. The see-through night vision apparatus of claim 16, wherein the optical subsystem further includes a second Amici reflector, located along the optical path, wherein the second Amici reflector has a second fold angle.

19. The see-through night vision apparatus of claim 18, wherein the fold angle of the second Amici reflector is other than ninety degrees (90°).

20. The see-through night vision apparatus of claim 19, wherein the second Amici reflector fold angle is approximately fifty degrees (50°).

21. The see-through night vision apparatus of claim 20, wherein the first Amici reflector fold angle is approximately seventy-five degrees (75°).

22. The see-through night vision apparatus of claim 16, wherein the first fold angle of the first Amici reflector, the second fold angle of the second Amici reflector, and the fold angles of the two fold mirrors are other than ninety degrees (90°).

23. The see-through night vision apparatus of claim 16, wherein the optical subsystem delivers a rotated image to the image intensifier.

24. The see-through night vision apparatus of claim 23, wherein the optical subsystem has an F/number relative aperture of 2.0 or greater.

25. The see-through night vision apparatus of claim 16, wherein the image intensifier includes an output window made of an optically clear, monolithic structure.

26. The see-through night vision apparatus of claim 25, wherein the optically clear, monolithic structure is glass, or a crystal such as quartz.

27. The see-through night vision apparatus of claim 16, wherein the image intensifier includes a fiber optic output window that rotates the output image.

28. The see-through night vision apparatus of claim 16, wherein the image intensifier includes a fiber optic output window that does not rotate the output image.

29. The see-through night vision apparatus of claim 16, wherein the image intensifier is a second-generation image intensifier.

30. The see-through night vision apparatus of claim 16, wherein the optical folds along the optical path do not fall within a common plane.

31. A see-through night vision apparatus, comprising:
a light entry port and a light exit port connected to the light entry port, wherein light exiting the light exit port is viewable by a user;
an optical path located between the light entry port and the light exit port;
an image intensifier located along the optical path and connected to the light entry port; and
an Amici reflector located along the optical path and connected to the light entry port;
at least two flat fold mirrors, each having their respective fold angle, and which are located along the optical path, between the light entry port and the image intensifier;
wherein the optical path defines at least two nonparallel planes.

\* \* \* \* \*

UNITED STATES PATENT AND TRADEMARK OFFICE
CERTIFICATE OF CORRECTION

| | | |
|---|---|---|
| PATENT NO. | : 9,507,153 B2 | Page 1 of 1 |
| APPLICATION NO. | : 14/343156 | |
| DATED | : November 29, 2016 | |
| INVENTOR(S) | : Danny Filipovich et al. | |

It is certified that error appears in the above-identified patent and that said Letters Patent is hereby corrected as shown below:

On the Title Page

Item (73), Assignee, replace "Elbit Systems Ltd Advanced Technology Center" with "Elbit Systems Ltd".

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*